United States Patent
Konchan et al.

(10) Patent No.: US 11,719,024 B2
(45) Date of Patent: Aug. 8, 2023

(54) METHOD OF UNLOCKING A VEHICLE DOOR

(71) Applicant: GM GLOBAL TECHNOLOGY OPERATIONS LLC, Detroit, MI (US)

(72) Inventors: Jeffrey L. Konchan, Romeo, MI (US); George Baker, Troy, MI (US); Besi Rrumbullaku, Rochester, MI (US); David T. Proefke, Troy, MI (US); Tricia E. Morrow, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1012 days.

(21) Appl. No.: 16/443,297

(22) Filed: Jun. 17, 2019

(65) Prior Publication Data

US 2020/0392768 A1   Dec. 17, 2020

(51) Int. Cl.

| | | |
|---|---|---|
| *E05B 81/76* | (2014.01) | |
| *E05B 77/24* | (2014.01) | |
| *E05B 81/72* | (2014.01) | |
| *E05B 85/12* | (2014.01) | |
| *E05B 77/32* | (2014.01) | |
| *E05B 77/28* | (2014.01) | |
| *B60R 25/20* | (2013.01) | |
| *B60R 25/10* | (2013.01) | |

(52) U.S. Cl.
CPC ............. *E05B 81/76* (2013.01); *B60R 25/20* (2013.01); *E05B 77/24* (2013.01); *E05B 77/287* (2013.01); *E05B 77/32* (2013.01); *E05B 81/72* (2013.01); *E05B 85/12* (2013.01); *B60R 25/1004* (2013.01); *Y10S 292/23* (2013.01); *Y10T 292/1047* (2015.04)

(58) Field of Classification Search
CPC ........ E05B 81/76; E05B 77/24; E05B 77/287; E05B 77/32; E05B 81/72; E05B 85/12; B60R 25/20; B60R 25/1004; Y10S 292/23; Y10T 92/57; Y10T 92/1082; Y10T 92/1043; Y10T 92/1047; Y10T 92/1078
USPC .......................................................... 701/36
See application file for complete search history.

(56) References Cited

U.S. PATENT DOCUMENTS

| | | | | |
|---|---|---|---|---|
| 7,129,597 | B2 * | 10/2006 | Proefke | ............... B60R 25/24 |
| | | | | 180/289 |
| 7,352,081 | B2 * | 4/2008 | Taurasi | ............... B60R 25/2036 |
| | | | | 340/5.31 |
| 9,284,758 | B2 * | 3/2016 | Yokomori | ............... E05B 81/72 |

(Continued)

*Primary Examiner* — Christine M Mills
*Assistant Examiner* — Faria F Ahmad
(74) *Attorney, Agent, or Firm* — Quinn IP Law (57) ABSTRACT

A method of deactivating a secondary lock feature of a vehicle includes sensing a movement of an interior door handle, and determining a status of the secondary lock feature to ascertain whether the secondary lock feature is active. The method includes starting a timer to measure an elapsed time since sensing the movement of the interior door handle, sensing an environmental condition of an interior passenger compartment of the vehicle with a sensor, and setting an unlock delay time based on the environmental condition. When the secondary lock feature is disposed in an active state and the elapsed time period is greater than or equal to the unlock delay time, the method includes automatically generating a control signal to thereby deactivate the secondary lock feature.

20 Claims, 2 Drawing Sheets

(56) References Cited

U.S. PATENT DOCUMENTS

| | | | |
|---|---|---|---|
| 9,707,889 B2* | 7/2017 | Konchan | E05B 81/72 |
| 2008/0103660 A1* | 5/2008 | Browne | G08B 21/22 |
| | | | 701/46 |
| 2009/0005936 A1* | 1/2009 | Browne | B60R 25/1004 |
| | | | 297/217.2 |
| 2010/0235059 A1* | 9/2010 | Krishnan | E05B 81/64 |
| | | | 701/49 |
| 2010/0283579 A1* | 11/2010 | Kraus | H04L 12/2818 |
| | | | 340/5.7 |
| 2011/0154740 A1* | 6/2011 | Matsumoto | E05B 81/66 |
| | | | 49/503 |
| 2013/0116858 A1* | 5/2013 | O'Dwyer | B60R 25/00 |
| | | | 701/2 |
| 2013/0207773 A1* | 8/2013 | Hathaway | B60K 28/12 |
| | | | 340/3.43 |
| 2014/0001778 A1* | 1/2014 | Yokomori | E05B 81/76 |
| | | | 292/336.3 |
| 2015/0176309 A1* | 6/2015 | Lange | E05B 85/08 |
| | | | 292/194 |
| 2016/0355128 A1* | 12/2016 | Konchan | E05B 81/72 |
| 2020/0290562 A1* | 9/2020 | Aragai | B60R 25/1003 |
| 2022/0186533 A1* | 6/2022 | Prince | E05B 85/16 |
| 2022/0198856 A1* | 6/2022 | Sobue | H04W 12/06 |

\* cited by examiner

METHOD OF UNLOCKING A VEHICLE DOOR

INTRODUCTION

The disclosure relates to a method of deactivating a secondary lock feature of a vehicle.

A vehicle door generally includes a door latch that secures the door to a body of the vehicle, and a door lock system that locks the door latch and prevents the door from being opened from an environment exterior to the vehicle. However, the door may be opened from an interior of the vehicle by operating an interior door handle.

In some vehicles, the door lock system may also be equipped with a secondary or double door lock feature. When activated, the secondary lock feature may prevent the door lock system from being unlocked and opened with either an exterior door handle or the interior door handle. Typically, the secondary lock feature may be inactivated or released by a remote, electronic keyless entry device, by an electronic signal from a vehicle lock controller, or by insertion and manipulation of a key in a key cylinder in a driver's side door of the vehicle.

SUMMARY

A method of deactivating a secondary lock feature of a vehicle includes sensing a movement of an interior door handle of the vehicle with a sensing device, and determining a status of the secondary lock feature with a secondary lock switch to ascertain if the secondary lock feature is disposed in an active state in which the interior door handle does not open the door. In addition, the method includes starting a timer to measure an elapsed time period since the sensing of the movement of the interior door handle. The method also includes sensing an environmental condition of an interior passenger compartment defined by the vehicle with a sensor, and setting an unlock delay time based on the environmental condition. When the secondary lock feature is disposed in the active state and the elapsed time period is greater than or equal to the unlock delay time, the method includes automatically generating a control signal to thereby deactivate the secondary lock feature.

In one aspect, the method may further include, after sensing the movement of the interior door handle, sensing a position of a door of the vehicle with a door position sensor to determine whether the door is in an unlatched position or a latched position.

In another aspect, sensing the environmental condition may include sensing at least one of a first temperature within the interior passenger compartment with a first temperature sensor; a second temperature of an ambient environment external to the vehicle with a second temperature sensor; and a light level within the interior passenger compartment with a light sensor.

In a further aspect, the method may include, after automatically generating, providing instructions to an occupant of the vehicle with at least one of an audio device and a visual device regarding a procedure for deactivating the secondary lock feature and opening the door.

In yet another aspect, the method may include, after providing instructions, resetting a value of an instruction counter to zero and incrementing the value by one each time the instructions are provided.

In an additional aspect, the method may further include comparing the value of the instruction counter to a first counter value with a vehicle lock controller. When the value of the instruction counter is greater than or equal to the first counter value, the method may include automatically contacting a service provider with an onboard communication device of the vehicle to request assistance in deactivating the secondary lock feature or opening the door.

In one aspect, after automatically contacting the service provider, the method may include starting a reset timer to measure a second time period. The method may further include comparing the second time period to a maximum unlock delay time with the vehicle lock controller.

In another aspect, the method may further include automatically generating a control signal to reactivate the secondary lock feature if the secondary lock feature is disposed in an inactive state, the second time period is greater than or equal to the maximum unlock delay time, and the door is in the latched position.

In a further aspect, the method may further include, in response to the control signal, transitioning a door lock system of the vehicle with a vehicle lock controller between a locked state in which actuation of an exterior door handle of the vehicle does not open the door and an unlocked state in which actuation of the exterior door handle opens the door.

In yet another aspect, the secondary lock feature may be further defined as at least one of a double door lock feature having the active state such that neither the exterior door handle nor the interior door handle opens a door of the vehicle, and a child lock feature having the active state such that the interior door handle does not open the door.

A method of deactivating a secondary lock feature of a vehicle includes sensing a movement of an interior door handle of the vehicle with a sensing device, and determining a status of the secondary door lock feature with a secondary lock switch to ascertain if the secondary lock feature is disposed in an active state in which the interior door handle does not open the door. The method further includes starting a timer to measure an elapsed time period since the sensing of the movement of the interior door handle, sensing an environmental condition of an interior passenger compartment defined by the vehicle with a sensor, and setting an unlock delay time based on the environmental condition. In addition, the method includes determining whether an occupant is present on a seat of the vehicle with a seat sensor. When the secondary lock feature is disposed in the active state, the elapsed time period is greater than or equal to the unlock delay time, and the occupant is present on the seat, the method includes automatically generating a control signal to thereby deactivate the secondary lock feature.

In one aspect, sensing the environmental condition may include sensing at least one of a first temperature within the interior passenger compartment with a first temperature sensor; a second temperature of an ambient environment external to the vehicle with a second temperature sensor; and a light level within the interior passenger compartment with a light sensor.

In another aspect, the method may further include prompting the occupant with at least one of an audio instruction and a visual instruction to actuate one or more components of the vehicle within a predetermined time period to thereby deactivate the secondary door feature.

In a further aspect, the method may also include, after prompting, receiving a voice command from the occupant.

In yet another aspect, the method may further include, before automatically generating the control signal, requesting a confirmation from the occupant to generate the control signal. Further, requesting may include re-requesting the confirmation after an interval.

A method of deactivating a secondary lock feature of a vehicle includes sensing a movement of an interior door handle of the vehicle with a sensing device, and determining a status of the secondary lock feature with a secondary door lock switch to ascertain if the secondary lock feature is disposed in an active state in which the interior door handle does not open the door. The method further includes starting a timer to measure an elapsed time period since the sensing of the movement of the interior door handle, and, after sensing the movement, sensing a position of the door with a door position sensor to determine whether the door is in an unlatched position or a latched position. After sensing the position, the method includes sensing at least one of a first temperature within an interior passenger compartment defined by the vehicle with a first temperature sensor, a second temperature of an ambient environment external to the vehicle with a second temperature sensor, and a light level within the interior passenger compartment with a light sensor; setting an unlock delay time based on the at least one of the first temperature, the second temperature, and the light level; and comparing the elapsed time period to the unlock delay time with a vehicle lock controller. When the elapsed time period is greater than or equal to the unlock delay time, the method includes determining whether an occupant is present on a seat of the vehicle with a seat sensor. When the secondary lock feature is disposed in the active state, the elapsed time period is greater than or equal to the unlock delay time, the door is in the latched position, and the occupant is present on the seat, the method includes automatically generating a control signal to thereby deactivate the secondary lock feature.

In one aspect, the method may include, before automatically generating the control signal, requesting a confirmation from the occupant to generate the control signal.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
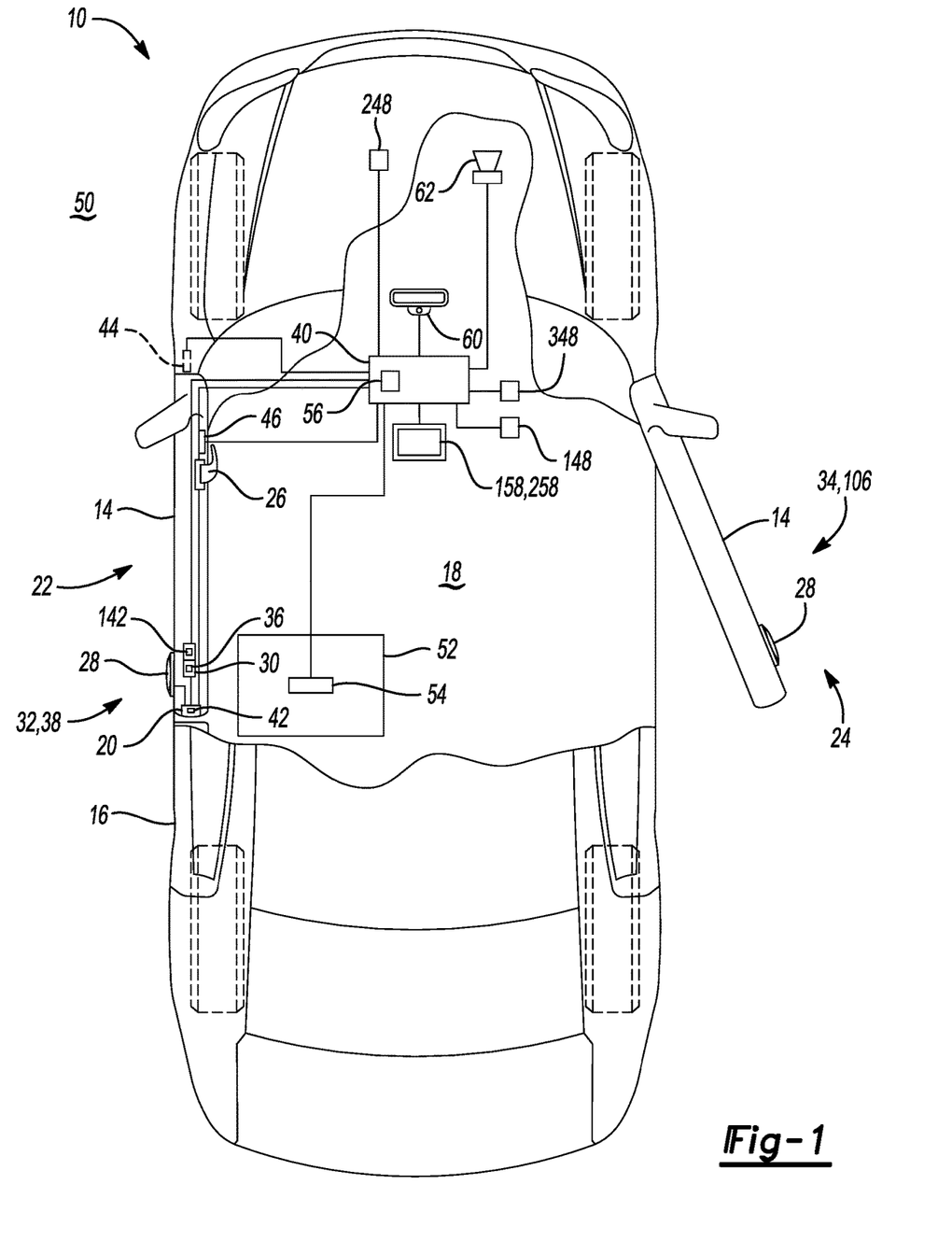
FIG. 1 is a schematic illustration of a plan, partially cutaway view of a vehicle.
Figure 2:
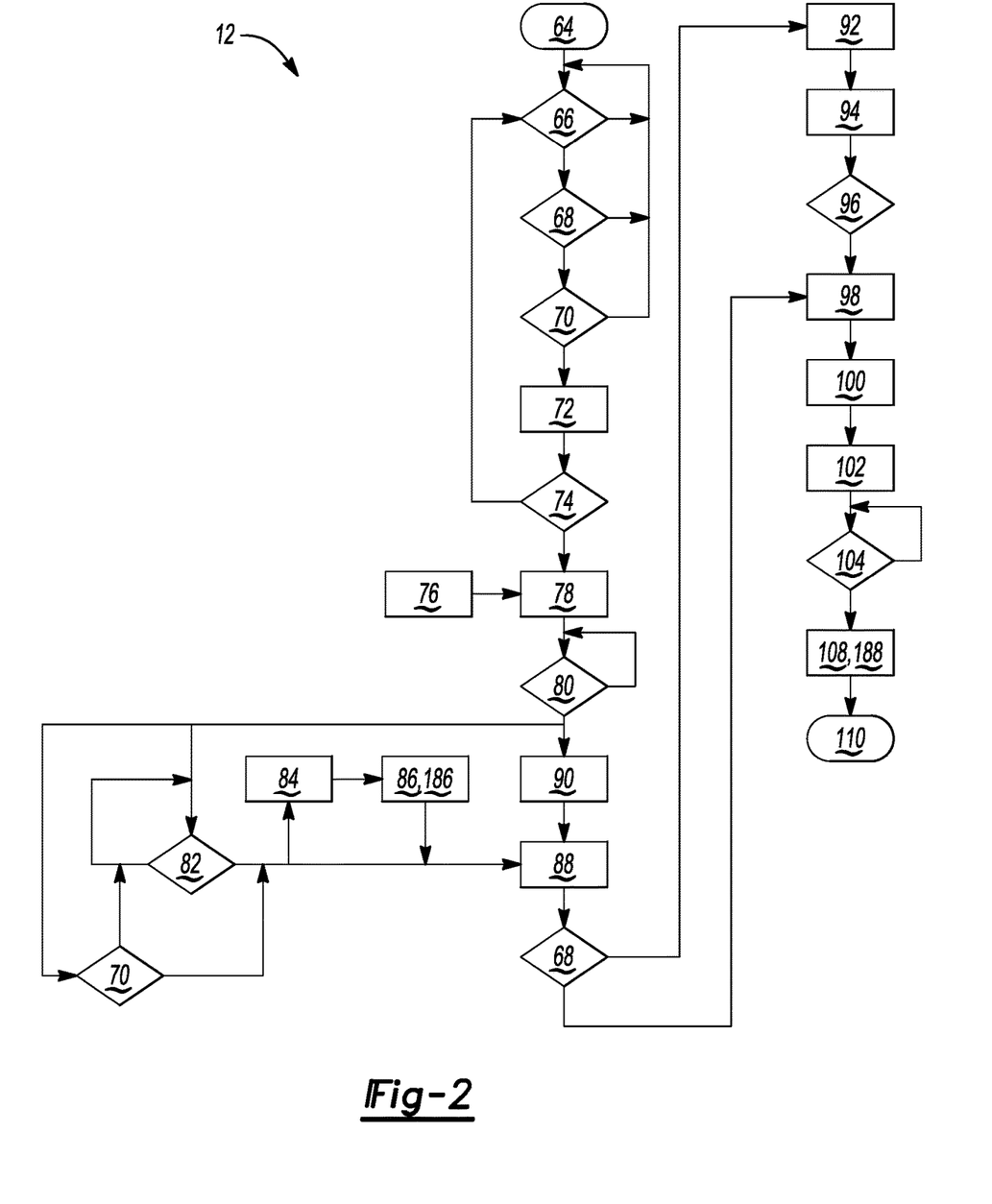
FIG. 2 is a flowchart of a method of deactivating a secondary lock feature of the vehicle of FIG. 1.

Referring to the Figures, wherein like reference numerals refer to like elements, a vehicle 10 and a method 12 of deactivating a secondary lock feature 36 of the vehicle 10 are shown generally in FIGS. 1 and 2. The vehicle 10 and method 12 may be useful for both minimizing vehicle theft and enhancing occupant comfort. That is, the vehicle 10 and method 12 may enhance protection from vehicle theft but also allow for desired occupant egress from the vehicle 10 on demand. In particular, as set forth in more detail below, the vehicle 10 includes the secondary lock feature 36, e.g., a double door lock feature and/or a child lock feature, and incorporate one or more sensors 44, 46, 54, 148, 248, 348 (FIG. 1) to detect when the occupant desires egress from the vehicle 10 while the secondary lock feature 36 is engaged. As such, the vehicle 10 and method 12 may maximize a time before the vehicle 10 initiates deactivation of the secondary lock feature 36 to thereby maximize robustness to attempted vehicle theft while still ensuring that the occupant may open a door 14 of the vehicle 10 by actuating an interior door handle 26 (FIG. 1) if desired for egress. Therefore, the vehicle 10 and method 12 may be useful for automotive vehicles such as a passenger car, sport utility vehicle, or truck. Alternatively, the vehicle 10 and method 12 may be useful for another vehicle type, such as, but not limited to, an industrial vehicle, a recreational off-road vehicle, a train, a semi-trailer, and the like.

Certain terminology may be used in the following description for the purpose of reference and is not intended to be limiting. For example, terms such as "above" and "below" refer to directions in the referenced Figures. Terms such as "front," "back," "left," "right," "rear," and "side" describe an orientation and/or location of a portion or portions of the components or elements of the vehicle 10 within a consistent but arbitrary frame of reference as set forth by the text and the associated Figures. Moreover, terms such as "first," "second," "third," and so on may be used to describe separate components. Such terminology may include the words specifically mentioned above, derivatives thereof, and similar words.

Referring again to FIG. 1, the vehicle 10 may include a body 16 and the door 14 configured to provide ingress and egress into and out of an interior passenger compartment 18 defined by the vehicle 10. The door 14 may include a latch 20 that is operable to secure the door 14 relative to the body 16 to prevent the door 14 from moving out of a latched position 22. When the latch 20 is engaged and the door 14 is secured by the latch 20, the door 14 may be secured relative to the body 16 in the latched position 22. When the latch 20 is disengaged, i.e., when the door 14 is unlatched, the door 14 may be free to move between the latched position 22 and an unlatched position 24. The latch 20 may include a suitable style and/or configuration of latch 20. For example, the latch 20 may include a fork bolt (not shown) supported by the door 14 that is rotatable to engage a striker (not shown) that is supported by the body 16. Further, the latch 20 may be actuated by either an interior door handle 26 or an exterior door handle 28.

As described with continued reference to FIG. 1, the door 14 may further include a door lock system 30. The door lock system 30 may be operable to lock the latch 20 to prevent the latch 20 from being moved from an engaged position into a disengaged position. The door lock system 30 may include a suitable style and/or configuration of lock capable of locking the latch 20. Further, the door lock system 30 may be moveable between a locked state 32, in which actuation of the exterior door handle 28 does not open the door 14, and an unlocked state 34 in which actuation of the exterior door handle 28 opens the door 14. When disposed in the locked state 32, the door lock system 30 may lock the latch 20 and may prevent the latch 20 from being disengaged. When disposed in the unlocked state 34, the door lock system 30 may not interfere with the latch 20 and may allow the latch 20 to be manipulated between the engaged state and the disengaged state. Therefore, as used herein, the terminology "unlock(ing) the door 14" refers to a) taking an action such that a state of the door 14 allows the occupant to enter or exit the vehicle 10 and/or b) enabling actuation and operation of the interior door handle 26.

The door lock system 30 may further include the secondary lock feature 36. For example, the secondary lock feature 36 may be further defined as at least one of a double door lock feature having an active state 38 such that neither the exterior door handle 28 nor the interior door handle 26 opens the door 14, and a child lock feature having the active state

38 such that the interior door handle 26 does not open the door 14. That is, the secondary lock feature 36 may be a double door lock feature and/or a child lock feature that, during standard operation, prevents the door 14 from opening upon movement of at least the interior door handle 26.

For example, when the double door lock feature is disposed in the active state 38, the secondary lock feature 36 may operate to lock the door lock system 30 and prevent actuation of the latch 20 by either the interior door handle 26 or the exterior door handle 28. That is, if the secondary lock feature 36 is disposed in the active state 38, neither the exterior door handle 28 nor the interior door handle 26 may open the door 14. The secondary lock feature 36 may include a device capable of mechanically locking the door lock system 30 in the locked state 32 and preventing either the interior door handle 26 or the exterior door handle 28 from actuating the latch 20. When the secondary lock feature 36 is disposed in the active state 38, the secondary lock feature 36 may prevent the door lock system 30 from transitioning 108 (FIG. 2) from the locked state 32 to the unlocked state 34 and may thereby prevent either the interior door handle 26 or the exterior door handle 28 from actuating the latch 20.

Similarly, when the child lock feature is disposed in the active state 38, the secondary lock feature 36 may operate to prevent actuation of the latch 20 by the interior door handle 26.

Referring again to FIG. 1, the vehicle 10 may also include a vehicle lock controller 40 that is configured to control the door lock system 30. That is, the door lock system 30 may be controlled via a control signal from the vehicle lock controller 40. For example, the vehicle lock controller 40 may send the control signal when signaled by a remote keyless entry device. Alternatively, the vehicle lock controller 40 may send the control signal to inactivate the secondary lock feature 36 in response to a signal from a remote service provider. Alternatively, as discussed herein, the vehicle lock controller 40 or another vehicle controller may send the control signal to inactivate the secondary lock feature 36 in response to satisfaction of one or more sensed and/or determined vehicle conditions, such as, for example and without limitation, movement of the interior door handle 26, a position of the door 14, an elapsed time period since a first sensed movement of the interior door handle 26, and a presence of the occupant on a seat 52.

As described with continued reference to FIG. 1, the vehicle 10 may further include a lock switch 42 coupled to the door lock system 30. The lock switch 42 may be operable to sense an operational mode of the door lock system 30, i.e., the locked state 32 or the unlocked state 34, and move or transition the door lock system 30 between the locked state 32 and the unlocked state 34. The lock switch 42 may include a type and/or style of switch suitable for use with the door lock system 30 and may be capable of transitioning 108 (FIG. 2) the door lock system 30 between the locked state 32 and the unlocked state 34. Further, the lock switch 42 may be in electronic communication with the vehicle lock controller 40. That is, the vehicle lock controller 40 may be operable to send and receive control signals to and from the lock switch 42 to determine and control the operational mode of the door lock system 30.

Similarly, the vehicle 10 may further include a secondary lock switch 142 coupled to the door lock system 30 and the secondary lock feature 36. The secondary lock switch 142 may be operable to sense a status of the secondary lock feature 36, e.g., the active state 38, and move or transition the secondary lock feature 36 to and from the active state 38. The secondary lock switch 142 may include a type and/or style of switch suitable for use with the door lock system 30 and may be capable of transitioning 108 (FIG. 2) the secondary lock feature 36 to and from the active state 38. Further, the secondary lock switch 142 may be in electronic communication with the vehicle lock controller 40. That is, the vehicle lock controller 40 may be operable to send and receive control signals to and from the secondary lock switch 142 to determine and control the status of the secondary lock feature 36.

The vehicle 10 may further include a door position sensor 44 that may be operable to sense a position of the door 14, i.e., the unlatched position 24 or the latched position 22. The door position sensor 44 may include a suitable type of sensor that is capable of sensing the position of the door 14. The door position sensor 44 may also be operable to sense continuous movement of the door 14 relative to the body 16. Further, the door position sensor 44 may be in electronic communication with the vehicle lock controller 40. That is, the vehicle lock controller 40 may be operable to send and receive signals to and from the door position sensor 44 to determine and/or identify the current position of the door 14.

Referring again to FIG. 1, the vehicle 10 may further include a sensing device 46, such as a door handle position sensor, that may be operable to sense a movement and/or a position of the interior door handle 26. The sensing device 46 may include a suitable type of sensor that is capable of sensing at least one of movement and position of the interior door handle 26. Further, the sensing device 46 may be in electronic communication with the vehicle lock controller 40. That is, the vehicle lock controller 40 may be operable to send and receive signals to and from the sensing device 46 to determine and/or identify the current position of the interior door handle 26.

In addition, the vehicle 10 may also include a sensor 148, 248, 348 that may be operable to sense an environmental condition within or external to the interior passenger compartment 18 defined by the vehicle 10. The sensor 148, 248, 348 may include a suitable type of sensing component that is capable of sensing the environmental condition. For example, the sensor 148, 248, 348 may be a first temperature sensor 148 configured for sensing a first temperature within the interior passenger compartment 18, a second temperature sensor 248 configured for sensing a second temperature of an ambient environment 50 external to the vehicle 10, and a light sensor 348 configured for sensing a light level within the interior passenger compartment 18. Further, the sensor 148, 248, 348 may be in electronic communication with the vehicle lock controller 40. That is, the vehicle lock controller 40 may be operable to send and receive signals to and from the sensor 148, 248, 348 to determine and/or identify the environmental condition.

Further, the vehicle 10 may also include the seat 52 configured to support the occupant and a seat sensor 54 that may be operable to sense whether the occupant is present on the seat 52. The seat sensor 54 may include a suitable type of sensing component that is capable of ascertaining, for example, a presence, weight, breathing rate, heart rate, and movement of the occupant. Although not shown, the vehicle 10 may also include a restraint sensor or switch that may be operable to sense whether the occupant is restrained in the seat 52. Further, the seat sensor 54 may be in electronic communication with the vehicle lock controller 40. That is, the vehicle lock controller 40 may be operable to send and receive signals to and from the seat sensor 54 to determine and/or identify the presence of the occupant on the seat 52.

The vehicle lock controller 40 may be operable to control the door lock system 30, including the secondary lock feature 36. The vehicle lock controller 40 may include a computer and/or processor, and include software, hardware, memory, algorithms, connections, sensors 44, 46, 54, 148, 248, 348, etc., to manage and control the operation of the door lock system 30 and the secondary lock feature 36. As such, the method 12, described below and generally shown in FIG. 2, may be embodied as a program operable on the vehicle lock controller 40. It should be appreciated that the vehicle lock controller 40 may include a device capable of analyzing data from various sensors 44, 46, 54, 148, 248, 348, and/or switches 42, 142, comparing data, making the decisions required to control the operation of the door lock system 30 and the secondary lock feature 36, and executing required tasks to control the operation of the door lock system 30 and the secondary lock feature 36.

The vehicle lock controller 40 may include tangible non-transitory memory having computer executable instructions recorded thereon that may include a lock control module (not illustrated). The vehicle lock controller 40 may further include a processor that is operable to execute the lock control module to perform one or more actions of the method 12 described below. The lock control module may use data from the sensor(s) 44, 46, 54, 148, 248, 348 and/or switches 42, 142 of the vehicle 10 to determine the position, condition, and/or status of the door 14, the door lock system 30, and the secondary lock feature 36.

More specifically, the vehicle lock controller 40 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics.

The computer-readable memory may include a non-transitory/tangible medium which may participate in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or other optical medium, as well as other possible memory devices such as flash memory.

The vehicle lock controller 40 may also include a timer 56 configured to measure an elapsed time period since sensing 66 (FIG. 2) of the movement of the interior door handle 26. The timer 56 may be integrated into the vehicle lock controller 40 and may be operable to measure time. The timer 56 may include a device capable of measuring time, such as an electronic clock, and storing in the memory of the vehicle lock controller 40 the elapsed time period since movement of the interior door handle 26.

Referring again to FIG. 1, the vehicle 10 may further include an audio and/or visual device 158, 258 coupled to the vehicle lock controller 40. The audio and/or visual device 158, 258 may be operable to communicate a message to the occupant of the vehicle 10 through at least one of audio outputs and visual outputs. For example, the audio and/or visual device 158, 258 may include, but is not limited to, speakers, a display screen, or a combination of both. The audio and/or visual device 158, 258 may be in electronic communication with the vehicle lock controller 40, which may provide an output signal for the audio and/or visual device 158, 258. By way of non-limiting examples, the visual device 258 may communicate with the occupant via a message displayed on a driver information center, an illuminated indicator, a graphical interface, animation on a center stack display, and the like.

The vehicle lock controller 40 may further be coupled to an onboard communication device 60 of the vehicle 10. The onboard communication device 60 may be operable to contact a remote service provider when activated. For example, the onboard communication device 60 may include a cellular or digital device capable of calling and/or sending an electronic communication to a designated service provider. The onboard communication device 60 may be activated by the vehicle lock controller 40 to contact the service provider located remote from the vehicle 10 to request assistance.

The vehicle 10 may further be equipped with an alarm system 62. The alarm system 62 may be operable to emit an alert to signal a potential break-in of the vehicle 10. The alarm system 62 may include a style and/or type of alarm suitable for use in the vehicle 10. Typically, when activated, the alarm system 62 may provide an auditory and visual alarm to draw attention to the vehicle 10. Additionally, the alarm system 62 may be remotely connected to the service provider to alert the remote service provider.

Referring now to FIG. 2, the method 12 of deactivating the secondary lock feature 36 of the vehicle 10 is generally described. In particular, the method 12 may include actions for controlling the vehicle 10 and, more specifically, for controlling the door lock system 30 and secondary lock feature 36 of the vehicle 10. However, it is to be appreciated that the order of operation of the method 12 is not limited to the sequential execution as illustrated in FIG. 2, but may be performed in one or more varying orders, or simultaneously, as applicable in accordance with the present disclosure.

The method 12 begins at 64 and proceeds to 66. That is, the method includes sensing 66 the movement of the interior door handle 26 of the vehicle 10 with the sensing device 46. In particular, the method 12 includes sensing 66 an operation or actuation of the interior door handle 26. Sensing 66 may determine if the occupant is attempting to open the door 14 from the inside of the vehicle 10. That is, sensing 66 may include determining whether the position of the interior door handle 26 has changed from the latched position 22. In particular, the sensing device 46 and/or vehicle lock controller 40 may sense and/or determine movement of the interior door handle 26 in a suitable manner. For example, the sensing device 46 may sense and/or determine movement of the interior door handle 26 based on data received from, e.g., the sensing device 46 or door handle position sensor, the lock switch 42, and/or the secondary lock switch 142. However, it should be appreciated that the sensing device 46 may use some other sensor capable of sensing the movement, position, condition, and/or status of the interior door handle 26 to determine movement of the interior door handle 26.

If the sensing device 46 does not sense or otherwise determine movement of the interior door handle 26, then no action is taken other than to continue monitoring and sensing 66 for movement of the interior door handle 26. When the sensing device 46 determines that the interior door handle 26 has moved, the method 12 may proceed to 68.

That is, the method 12 may include determining 68 the operational mode of the door lock system 30 of the vehicle 10 with the lock switch 42 to ascertain whether the door lock system 30 is disposed in the locked state 32 in which actuation of the exterior door handle 28 of the vehicle 10 does not open the door 14, or the unlocked state 34 in which actuation of the exterior door handle 28 opens the door 14. That is, determining 68 may include noting whether the door 14 is locked based on a state or signal of the lock switch 42. However, it is to be appreciated that determining 68 may not be required since in some instances, the interior door handle 26 may still be operable when the door 14 is locked, yet egress from the vehicle 10 is allowed. For example, in some cases, a first actuation of the interior door handle 26 may unlock the door 14 and a second actuation of the interior door handle 26 may open the door 14.

If the lock switch 42 determines that the door lock system 30 is not disposed in the locked state 32 or is disposed in the locked state 32 while egress is still allowed (e.g., upon double actuation of the interior door handle 26), then no action is taken since the door 14 may be opened by the occupant upon actuation of the interior door handle 26. When the method 12 determines that the door lock system 30 is disposed in the locked state 32, i.e., that the door 14 is latched and locked to the body 16 (FIG. 1), the method 12 may proceed to 70.

That is, the method 12 further includes determining 70 the status of the secondary lock feature 36 with the secondary lock switch 142 to ascertain if the secondary lock feature 36 is disposed in the active state 38 in which neither the exterior door handle 28 nor the interior door handle 26 opens the door 14. Stated differently, the method 12 includes determining 70 the current status of the secondary lock feature 36, e.g., the double door lock feature. The secondary lock switch 142 and/or the vehicle lock controller 40 may determine or sense the status of the secondary lock feature 36 in a suitable manner. For example, the vehicle lock controller 40 may determine the status of the secondary lock feature 36 based on data received from the secondary lock switch 142. However, it should be appreciated that the vehicle lock controller 40 may also use some other sensor capable sensing the status of the secondary lock feature 36 to determine the status.

If the secondary lock switch 142 does not indicate that the secondary lock feature 36 is disposed in the active state 38, then no action is taken since the door 14 may be opened by the occupant upon actuation of the interior door handle 26. If the vehicle lock controller 40 determines that the secondary lock feature 36 is disposed in the active state 38 such that the occupant cannot open the door 14 with the interior door handle 26 and/or the exterior door handle 28, the method 12 proceeds to 72.

That is, the method 12 further includes starting 72 the timer 56 (FIG. 1) to measure the elapsed time period since sensing 66 of the movement of the interior door handle 26. That is, the vehicle lock controller 40 may reset the timer 56, e.g., an opening attempt timer, to a time of zero, and then may start the timer 56 to measure the elapsed time period since sensing 66 the movement of the interior door handle 26. Further, the timer 56 may continuously measure the elapsed time period. Therefore, starting 72 the timer 56 may include temporarily pausing or delaying the method 12 to allow the occupant to exit the vehicle 10 via other means. That is, the method 12 may not resume or proceed until the delay or elapsed time period, as measured by the timer 56, is complete.

As described with continued reference to FIG. 2, the method 12 may include, after sensing 66 the movement of the interior door handle 26, sensing 74 a position of the door 14 with the door position sensor 44 to determine whether the door 14 is in the unlatched position 24 or the latched position 22. That is, the door position sensor 44 and/or the vehicle lock controller 40 may sense and/or determine the position of the door 14. More specifically, the door position sensor 44 may sense the position of the door 14 and determine if the door 14 remains in the latched position 22 after movement of the interior door handle 26, or if the door 14 moves to the unlatched position 24 after movement of the interior door handle 26. The door position sensor 44 and/or vehicle lock controller 40 may sense the position of the door 14 in a suitable manner. For example, the vehicle lock controller 40 may sense and/or determine the position of the door 14 based on data received from the door position sensor 44. However, it should be appreciated that the vehicle lock controller 40 may use some other sensor capable sensing the position, condition, and/or status of the door 14 to determine the current position and/or change in position of the door 14.

If the method 12 senses or determines that the position of the door 14 has moved from the latched position 22 to the unlatched position 24 after movement of the interior door handle 26, then the vehicle lock controller 40 may return to continue to monitor or sense for actuation or movement of the interior door handle 26, at 66. If the method 12 senses or determines that the position of the door 14 has not changed, and that the door 14 remains in the latched position 22 after movement of the interior door handle 26 is sensed, then the method 12 proceeds.

That is, referring again to FIG. 2, the method 12 also includes sensing 76 the environmental condition of the interior passenger compartment 18 defined by the vehicle 10 with the sensor 148, 248, 348. Stated differently, after sensing 74 the position, the method 12 may include evaluating the environmental condition within and surrounding the vehicle 10. By way of non-limiting examples, the environmental condition may include a temperature, light level, noise level, and the like within or external to the vehicle 10. For example, sensing 76 the environmental condition may include sensing at least one of: the first temperature within the interior passenger compartment 18 with the first temperature sensor 148, the second temperature of the ambient environment 50 external to the vehicle 10 with the second temperature sensor 248, and the light level within the interior passenger compartment 18 with the light sensor 348. Such sensing 76 may attempt to summarize a potential overall comfort level of the occupant who may desire egress from the vehicle 10. For example, sensing 76 may suggest whether the occupant may potentially be in distress within the interior passenger compartment 18 due to high temperature levels, darkness, and/or excessive noise near or within the vehicle 10.

Next, the method 12 includes setting 78 an unlock delay time based on the environmental condition. That is, the method 12 may include setting 78 the unlock delay time with the vehicle lock controller 40 based on or according to at least one of the first temperature, the second temperature, and the light level. Stated differently, setting 78 may include noting a desired delay time to unlock, i.e., undouble lock, the door 14 based on input from the one or more sensors 148, 248, 348. For instance, if the first and/or second temperature sensors 148, 248 sense a high temperature within or external to the interior passenger compartment 18, and/or sense a low light level near the vehicle 10, the desired delay time may be comparatively lower than an instance in which the first and/or second temperature sensors 148, 248 sense a relatively comfortable temperature within or external to the vehicle and adequate light levels within the interior passenger compartment 18. That is, the unlock delay time may be a pre-defined period of time allotted to allow the occupant of the vehicle 10 to move the door 14 from the latched position 22 to the unlatched position 24. It may be assumed that if the occupant fails to move the door 14 from the latched position 22 to the unlatched position 24 within the unlock delay time, and after actuating the interior door handle 26, that the occupant is for some reason unable to open the door 14. As such, setting 78 the unlock delay time may help to mitigate an immediate threat of a vehicle break-in or theft, but may still enable the occupant to eventually exit the vehicle 10 as desired.

Referring again to FIG. 2, the method 12 may also include comparing 80 the elapsed time period to the unlock delay time with the vehicle lock controller 40. That is, after sensing 74 the position of the door 14, the method may include comparing 80 the elapsed time period since movement of the interior door handle 26, measured by the timer 56, to the set unlock delay time and calculating whether the elapsed time period is less than, equal to, or greater than the set unlock delay time.

If the elapsed time period is less than the set unlock delay time, the method 12 may continue to compare the elapsed time period to the unlock delay time. However, when the elapsed time period is greater than or equal to the unlock delay time, the method 12 may include determining 82 whether the occupant is present on the seat 52 (FIG. 1) of the vehicle 10 with the seat sensor 54. That is, the seat sensor 54 may sense at least one of the weight, breathing rate, heart rate, and movement of the occupant to determine whether the occupant is disposed on or near the seat 52.

In one embodiment, if the occupant is not present on the seat 52, the method 12 may optionally include evaluating whether the child lock feature is in the active state 38. That is, the method 12 may further include determining 70 the status of the secondary lock feature 36, e.g., the child lock feature, with the secondary lock switch 142 to ascertain if the child lock feature is disposed in the active state 38.

If the child lock feature is not in the active state 38, the method 12 may continue to monitor for the presence of the occupant on the seat 52. However, if the child lock feature is in the active state 38 or if the occupant is present on the seat 52, the method 12 may optionally further include prompting 84 the occupant with at least one of an audio instruction and a visual instruction to actuate one or more components of the vehicle 10 within a predetermined time period to thereby deactivate or disable the secondary lock feature 36. For example, prompting 84 may include audibly and/or visually instructing the occupant to perform a series of actions in sequence or concurrently to thereby deactivate the secondary lock feature 36. By way of one non-limiting example, prompting 84 may include audibly instructing the occupant or visually instructing the occupant by way of a display (not shown) of the vehicle 10 to depress a defrost button of the vehicle 10 while actuating a turn signal control of the vehicle 10 within the predetermined time period to thereby deactivate the secondary lock feature 36. Alternatively, by way of another non-limiting example, prompting 84 may include audibly and/or visually instructing the occupant to turn on the radio of the vehicle 10, actuate the emergency signals of the vehicle 10, and operate a heater fan control of the vehicle 10 to thereby deactivate the secondary lock feature 36.

The method 12 may further include, after prompting 84, receiving 86 a voice command from the occupant. For example, receiving 86 may include re-prompting the occupant to confirm that the occupant in fact wishes for the secondary lock feature 36 to be disabled such that the occupant may open the door 14 from the interior passenger compartment 18 with the interior door handle 26. The method 12 may include receiving 86 a voice confirmation from the occupant to proceed with deactivating the secondary lock feature 36 to allow, for example, first responders to open the door 14 with the exterior door handle 28. Alternatively, for instances of imminent danger to the occupant external to the vehicle 10, the method 12 may include receiving 186 an indication, such as a screen touch or a depressed button, that the occupant instead wishes for the door 14 to remain locked such that neither the exterior door handle 28 nor the interior door handle 26 may open the door 14.

Therefore, referring again to FIG. 2, when the secondary lock feature 36 is disposed in the active state 38 and the elapsed time period is greater than or equal to the unlock delay time, the method 12 includes automatically generating 88 a control signal to thereby deactivate the secondary lock feature 36. In some embodiments, the method 12 may also include unlocking the door lock system 30 to allow for opening of the door 14 with the exterior door handle 28. In particular, for some embodiments, when the secondary lock feature 36 is disposed in the active state 38, the elapsed time period is greater than or equal to the unlock delay time, and the occupant is present on the seat 52, the method 12 includes automatically generating the control signal to thereby deactivate the secondary lock feature 36. More specifically, for some embodiments, when the secondary lock feature 36 is disposed in the active state 38, the elapsed time period is greater than or equal to the unlock delay time, the door 14 is in the latched position 22, and the occupant is present on the seat 52, the method 12 includes automatically generating the control signal to thereby deactivate the secondary lock feature 36. Therefore, as discussed in more detail below, the method 12 may include transitioning 108 the door lock system 30 between the locked state 32 and the unlocked state 34 with the vehicle lock controller 40 in response to the control signal.

For example, the vehicle lock controller 40 or another vehicle controller, such as a body control module (BCM), may send the control signal to the door lock system 30 to deactivate the secondary lock feature 36. That is, the vehicle lock controller 40 or another vehicle controller may generate the control signal to automatically deactivate the secondary lock feature 36 when the method 12 determines, based on the current elapsed time period and the position of the door 14, that the occupant has not successfully opened the door 14.

Referring to FIG. 2, the method 12 may also include, before automatically generating 88 the control signal, requesting 90 a confirmation from the occupant to generate the control signal. The confirmation may be, for example, an indication, such as a screen touch or a depressed button or a verbal command, that the occupant does or does not wish for the secondary lock feature 36 to be deactivated. In addition, the requesting 90 may include re-requesting the confirmation after an interval. That is, the method 12 may again ask the detected occupant after, for example, the interval of about 5 minutes, to again confirm that the control signal to deactivate the secondary lock feature 36 should be generated. As such, the method 12 may continually offer the occupant an opportunity to deactivate the secondary lock feature 36 in case the occupant is sleeping or unconscious or in case a situation external to the vehicle has changed.

Next, the method 12 may include determining 68 the status of the secondary lock feature 36. That is, the vehicle lock controller 40 may sense and/or determine the status of the secondary lock feature 36, i.e., whether the secondary lock feature 36 is in the active state 38 or the inactive state 106. Sensing and/or determining 68 whether the secondary lock feature 36 is in the active 38 or the inactive state 106 may additionally provide information regarding whether the control signal to deactivate the secondary lock feature 36 was successfully received and completed.

If the vehicle lock controller 40 senses and/or determines that the control signal has been automatically generated and the secondary lock feature 36 is in the inactive state 106, the method 12 may proceed to 92. That is, the method 12 may include, after automatically generating 88, providing 92 instructions to the occupant of the vehicle 10 with at least one of the audio device 158 and the visual device 258 regarding a procedure for deactivating the secondary lock feature 36 and opening the door 14. Providing 92 instructions may occur after a time delay, e.g., 10 seconds or 15 seconds. For example, the vehicle lock controller 40 may provide audio instructions to the occupant regarding the proper procedure for deactivating the secondary lock feature 36 and opening the door 14 from the interior of the vehicle 10 through the radio system or other system speakers of the vehicle 10. Alternatively, if the vehicle 10 is equipped with a visual display/control center, then the vehicle lock controller 40 may display the proper instructions for the occupant. In some embodiments, the vehicle lock controller 40 may display and/or provide the instructions to the occupant multiple times. In some embodiments, the vehicle lock controller 40 may request an input from the occupant to acknowledge receipt of the instructions. The input may be received through a suitable device, such as the visual display/control center.

As described with continued reference to FIG. 2, the method 12 may also include, after providing 92 instructions, resetting 94 a value of an instruction counter to zero and increasing the value by one each time the instructions are provided. The instruction counter may be integrated into the vehicle lock controller 40 and may be operable to count a number of times the instructions are provided to the occupant. The instruction counter may include a device capable of tracking and storing in the memory of the vehicle lock controller 40 the number of times the instructions are provided to the occupant. For example, the value of the instruction counter may be reset to equal zero when the vehicle lock controller 40 provides a first instruction regarding the proper procedure for deactivating the secondary lock feature 36 and/or opening the door 14. The vehicle lock controller 40 may increment the value of the instruction counter by one for each time the instructions are provided to the occupant. For example, the first time that the vehicle lock controller 40 provides instructions to the occupant, the value of the instruction counter may be increased from a value of zero to a value of one. A second time the vehicle lock controller 40 provides instructions to the occupant, the value of the instruction counter may be increased from a value of one to a value of two. This process may continue each time the vehicle lock controller 40 provides instructions to the occupant until the value of the instruction counter is reset to zero.

The method 12 may also include comparing 96 the value of the instruction counter to a first counter value with the vehicle lock controller 40. That is, the vehicle lock controller 40 may compare the value of the instruction counter to the first counter value to determine if the value of the instruction counter is equal to or greater than the first counter value, or if the value of the instruction counter is less than the first counter value. The first counter value may be a pre-defined value allotting a number of times instructions may be provided to the occupant. In some embodiments, the first counter value is two, thus allowing a maximum of two occurrences of providing instructions to the occupant. In some embodiments, the first counter value is 3, 4, 5, or more occurrences of providing instructions to the occupant.

If the vehicle lock controller 40 senses and/or determines that the secondary lock feature 36 remains in the active state 38 such that operation of the interior door handle 26 is not enabled, or when the value of the instruction counter is greater than or equal to the first counter value, the method 12 may include automatically contacting 98 a service provider with an onboard communication device 60 of the vehicle 10 to request assistance in opening the door 14 or deactivating the secondary lock feature 36. For example, the vehicle lock controller 40 may contact the remote service provider with the onboard communication device 60 to request that an emergency vehicle be directed to a current location of the vehicle 10 to assist the occupant in exiting the vehicle 10. Alternatively, after initiating contact with the remote service provider such that the remote service provider may verify an identity of the occupant, the remote service provider may signal the vehicle lock controller 40 from a remote location to move the door lock system 30 from the locked state 32 the unlocked state 34 and to signal the vehicle lock controller 40 to deactivate the secondary lock feature 36 to allow the occupant to open the door 14.

Alternatively, if the vehicle lock controller 40 determines that the value of the instruction counter is less than the first counter value, the vehicle lock controller 40 may continue to sense and/or determine a position of the door 14, generally indicated at 74. In some embodiments, after the vehicle lock controller 40 automatically contacts 98 the remote service provider, the vehicle lock controller 40 may continue to sense and/or determine the position of the door 14. The method 12 may then proceed as discussed herein.

In some embodiments, after the vehicle lock controller 40 automatically contacts the remote service provider, generally indicated at 98, the method 12 may include starting 100 a reset timer to measure a second time period. For example, the vehicle lock controller 40 may reset the reset timer to a time of zero and then start the reset timer to measure an elapsed time period since contact with the remote service provider, generally indicated at 102. The reset timer may be integrated into the vehicle lock controller 40 and may be operable to measure time. The reset timer may include a device capable of measuring time, such as an electronic clock, and storing in the memory of the vehicle lock controller 40 the elapsed period of time since contacting 98 the remote service provider. It should be appreciated that the reset timer may measure the period of time continuously until stopped and reset to a value of zero.

Next, the method 12 may further include comparing 104 the second time period to a maximum unlock delay time with the vehicle lock controller 40. That is, the vehicle lock controller 40 may compare the second time period, as measured by the reset timer, to a predefined maximum lock delay time. The measured second time period may be compared to the maximum lock delay time to determine if the measured second time period is equal to or greater than the maximum lock delay time, or if the measured second time period is less than the maximum lock delay time. The maximum lock delay time may be a pre-defined period of time allotted before re-activation of the secondary lock feature 36. In some embodiments, the maximum lock delay time is approximately two minutes. In other embodiments, the maximum lock delay time is approximately one minute, approximately three minutes, approximately four minutes, or another amount of time and may be calibratable based on, for example, vehicle location considerations and other factors.

The method 12 may also include, automatically generating 188 the control signal to reactivate the secondary lock feature 36 if the secondary lock feature 36 is disposed in the inactive state 106 (FIG. 1), i.e., in which the interior door handle 26 opens the door 14, the second time period is greater than or equal to the maximum unlock delay time, and the door is in the latched position 22. If the vehicle lock controller 40 determines that the current second time period, measured by the reset timer, is less than the maximum lock delay time, then the vehicle lock controller 40 may continue to monitor the status of the secondary lock feature 36 and the elapsed time period.

However, if the vehicle lock controller 40 determines that the current second time period, measured by the reset timer, is greater than or equal to the maximum lock delay time, the secondary lock feature 36 is in the inactive state 106, and the door 14 is in the latched position 22, then the method 12 may include automatically generating 188 the control signal to reset the secondary lock feature 36. That is, the vehicle lock controller 40 or another vehicle controller, such as the body control module (BCM), may send the control signal to reactivate or reset the secondary lock feature 36. As such, when the current second time period is greater than or equal to the maximum lock delay time, the secondary lock feature 36 may be reactivated to secure the vehicle 10 if the occupant has not exited the vehicle 10 in the allotted maximum lock delay time. In other words, secondary lock feature 36 may be reactivated to re-secure the vehicle 10 since it is likely that a theft attempt is underway. The method 12 may then either end, as generally indicated at 110, or may repeat continuously, returning to the start at 64 and proceeding as discussed herein.

Further, many variations and modifications may be made to the described embodiments, the elements of which are to be understood as being among other acceptable examples. Such modifications and variations are intended to be included within the scope of this disclosure and protected by the following claims. Moreover, the actions described herein can be performed simultaneously or in a different order than described. In addition, the features and attributes of the specific embodiments may be combined in different ways to form additional embodiments which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, and/or states are required for one or more embodiments or that one or more embodiments necessarily include logic for deciding, with or without author input or prompting, whether these features, elements, and/or states are included or are to be performed in a particular embodiment.

Moreover, the singular forms "a," "an," and "the" include plural referents unless the context clearly dictates otherwise. Thus, for example, reference to an item includes reference to one or more items. The term "ones" refers to one, two, or more, and generally applies to the selection of some of a quantity. The term "plurality" refers to two or more of an item. The term "about" or "approximately" means that quantities, dimensions, sizes, formulations, parameters, shapes, and other characteristics need not be exact, but may be approximated and/or larger or smaller, as desired, reflecting acceptable tolerances, conversion factors, rounding off, measurement error, and the like. The term "substantially" means that the recited characteristic, parameter, or value need not be achieved exactly, but that deviations or variations, including for example, tolerances, measurement error, measurement accuracy limitations, and other factors, may occur in amounts that do not preclude an effect the characteristic was intended to provide.

In addition, a plurality of items may be presented in a common list for convenience. However, the list should be construed as though each member of the list is individually identified as a separate and unique member. Thus, no individual member of the list should be construed as a de facto equivalent of another member of the same list solely based on a presentation in a common group without indications to the contrary. Furthermore, where the terms "and" and "or" are used in conjunction with a list of items, they are to be interpreted broadly, in that one or more of the listed items may be used alone or in combination with other listed items. The term "alternatively" refers to selection of one of two or more alternatives, and is not intended to limit the selection to solely listed alternatives or to solely one of the listed alternatives at a time, unless the context clearly indicates otherwise.

Further, the processes, methods 12, or algorithms disclosed herein can be deliverable to and/or implemented by a processing device, controller, or computer, which can include an existing programmable electronic control unit or dedicated electronic control unit. Similarly, the processes, methods 12, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods 12, or algorithms can also be implemented in a software executable object. Alternatively, the processes, methods 12, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components. Such example devices may be on-board as part of a vehicle computing system or may be located off-board and conduct remote communication with devices on one or more vehicles 10.

While exemplary embodiments are described above, it is not intended that these embodiments describe each possible form encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages over other embodiments or implementations with respect to one or more desired characteristics, one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or implementations with respect to one or more characteristics are not outside the scope of the disclosure and can be desirable for particular applications.

Therefore, the vehicle 10 and method 12 may minimize vehicle theft and enhance occupant comfort. That is, the vehicle 10 and method 12 may enhance protection from vehicle theft but also allow for desired occupant egress from the vehicle 10 on demand. In particular, the secondary lock feature 36, seat sensor 54, and temperature and light sensors 148, 248, 348 (FIG. 1) may detect when the occupant desires egress from the vehicle 10 while the secondary lock feature 36 is engaged. Therefore, the vehicle 10 and method 12 may help to mitigate an immediate threat of a vehicle break-in or theft, but may still enable the occupant to eventually exit the vehicle 10 as desired. Stated differently, the vehicle 10 and method 12 may maximize a time before the vehicle 10 initiates deactivation of the secondary lock feature 36 to thereby maximize robustness to attempted vehicle theft while still ensuring that the occupant may open the door 14 by actuating the interior door handle 26 for egress.

While the best modes for carrying out the disclosure have been described in detail, those familiar with the art to which this disclosure relates will recognize various alternative designs and embodiments for practicing the disclosure within the scope of the appended claims.

What is claimed is:

1. A method of deactivating a secondary lock feature of a vehicle, the method comprising:
   sensing a movement of an interior door handle of the vehicle with a sensing device;
   determining a status of the secondary lock feature with a secondary lock switch to ascertain if the secondary lock feature is disposed in an active state in which the interior door handle does not open a door;
   starting a timer to measure an elapsed time period since the sensing of the movement of the interior door handle;
   sensing an environmental condition of an interior passenger compartment defined by the vehicle with a sensor;
   setting an unlock delay time based on the environmental condition; and
   when the secondary lock feature is disposed in the active state and the elapsed time period is greater than or equal to the unlock delay time, automatically generating a control signal to thereby deactivate the secondary lock feature.

2. The method of claim 1, further including, after sensing the movement of the interior door handle, sensing a position of the door of the vehicle with a door position sensor to determine whether the door is in an unlatched position or a latched position.

3. The method of claim 1, wherein the sensor includes at least one of a first temperature sensor, a second temperature sensor, and a light sensor, and wherein sensing the environmental condition includes sensing at least one of:
   a first temperature within the interior passenger compartment with the first temperature sensor;
   a second temperature of an ambient environment external to the vehicle with the second temperature sensor; and
   a light level within the interior passenger compartment with the light sensor.

4. The method of claim 3, further comprising, after automatically generating, providing instructions to an occupant of the vehicle with at least one of an audio device and a visual device regarding a procedure for deactivating the secondary lock feature and opening the door.

5. The method of claim 4, further comprising, after providing instructions, resetting a value of an instruction counter to zero and incrementing the value by one each time the instructions are provided.

6. The method of claim 5, further comprising comparing the value of the instruction counter to a first counter value with a vehicle lock controller.

7. The method of claim 6, further comprising, when the value of the instruction counter is greater than or equal to the first counter value, automatically contacting a service provider with an onboard communication device of the vehicle to request assistance in deactivating the secondary lock feature or opening the door.

8. The method of claim 7, further comprising, after automatically contacting the service provider, starting a reset timer to measure a second time period.

9. The method of claim 8, further comprising comparing the second time period to a maximum unlock delay time with the vehicle lock controller.

10. The method of claim 9, further comprising automatically generating a control signal to reactivate the secondary lock feature if the secondary lock feature is disposed in an inactive state, the second time period is greater than or equal to the maximum unlock delay time, and the door is in a latched position.

11. The method of claim 1, further comprising, in response to the control signal, transitioning a door lock system of the vehicle with a vehicle lock controller between:
   a locked state in which actuation of an exterior door handle of the vehicle does not open the door; and
   an unlocked state in which actuation of the exterior door handle opens the door.

12. The method of claim 1, wherein the secondary lock feature is further defined as at least one of a double door lock feature having the active state such that neither an exterior door handle of the vehicle nor the interior door handle opens the door of the vehicle, and a child lock feature having the active state such that the interior door handle does not open the door.

13. A method of deactivating a secondary lock feature of a vehicle, the method comprising:
   sensing a movement of an interior door handle of the vehicle with a sensing device;
   determining a status of the secondary lock feature with a secondary lock switch to ascertain if the secondary lock feature is disposed in an active state in which the interior door handle does not open a door;
   starting a timer to measure an elapsed time period since the sensing of the movement of the interior door handle;
   sensing an environmental condition of an interior passenger compartment defined by the vehicle with a sensor;
   setting an unlock delay time based on the environmental condition;
   determining whether an occupant is present on a seat of the vehicle with a seat sensor; and
   when the secondary lock feature is disposed in the active state, the elapsed time period is greater than or equal to the unlock delay time, and the occupant is present on the seat, automatically generating a control signal to thereby deactivate the secondary lock feature.

14. The method of claim 13, wherein the sensor includes at least one of a first temperature sensor, a second temperature sensor, and a light sensor, and wherein sensing the environmental condition includes sensing at least one of:

a first temperature within the interior passenger compartment with the first temperature sensor;

a second temperature of an ambient environment external to the vehicle with the second temperature sensor; and a light level within the interior passenger compartment with the light sensor.

15. The method of claim 13, further including prompting the occupant with at least one of an audio instruction and a visual instruction to actuate one or more components of the vehicle within a predetermined time period to thereby deactivate the secondary lock feature.

16. The method of claim 15, further including, after prompting, receiving a voice command from the occupant.

17. The method of claim 15, further including, before automatically generating the control signal, requesting a confirmation from the occupant to generate the control signal.

18. The method of claim 17, wherein requesting includes re-requesting the confirmation after an interval.

19. A method of deactivating a secondary lock feature of a vehicle, the method comprising:

sensing a movement of an interior door handle of the vehicle with a sensing device;

determining a status of the secondary lock feature with a secondary lock switch to ascertain if the secondary lock feature is disposed in an active state in which the interior door handle does not open a door;

starting a timer to measure an elapsed time period since the sensing of the movement of the interior door handle;

after sensing the movement, sensing a position of the door with a door position sensor to determine whether the door is in an unlatched position or a latched position;

after sensing the position, sensing at least one of:

a first temperature within an interior passenger compartment defined by the vehicle with a first temperature sensor;

a second temperature of an ambient environment external to the vehicle with a second temperature sensor; and a light level within the interior passenger compartment with a light sensor;

setting an unlock delay time based on the at least one of the first temperature, the second temperature, and the light level; and comparing the elapsed time period to the unlock delay time with a vehicle lock controller;

when the elapsed time period is greater than or equal to the unlock delay time, determining whether an occupant is present on a seat of the vehicle with a seat sensor; and when the secondary lock feature is disposed in the active state, the elapsed time period is greater than or equal to the unlock delay time, the door is in the latched position, and the occupant is present on the seat, automatically generating a control signal to thereby deactivate the secondary lock feature.

20. The method of claim 19, further including, before automatically generating the control signal, requesting a confirmation from the occupant to generate the control signal.

* * * * *